US009494099B2

(12) United States Patent
Rieger et al.

(10) Patent No.: US 9,494,099 B2
(45) Date of Patent: Nov. 15, 2016

(54) METHOD FOR OPERATING A DRIVE UNIT AND DRIVE UNIT

(75) Inventors: Thomas Rieger, Wettstetten (DE); Peter Kaeufler, Boehmfeld (DE)

(73) Assignee: AUDI AG, Ingolstadt (DE)

( * ) Notice: Subject to any disclaimer, the term of this patent is extended or adjusted under 35 U.S.C. 154(b) by 1091 days.

(21) Appl. No.: 12/913,341

(22) Filed: Oct. 27, 2010

(65) Prior Publication Data

US 2011/0160981 A1 Jun. 30, 2011

(30) Foreign Application Priority Data

Oct. 28, 2009 (DE) .................. 10 2009 051 023

(51) Int. Cl.
*F02D 41/22* (2006.01)
*F02D 41/14* (2006.01)
(Continued)

(52) U.S. Cl.
CPC ........... *F02D 41/22* (2013.01); *F02D 41/1454* (2013.01); *F02D 41/187* (2013.01); *F02D 41/222* (2013.01);
(Continued)

(58) Field of Classification Search
CPC ............... F02D 2200/0602; F02D 41/3845; F02D 2041/224; F02D 41/221; F02D
(Continued)

(56) References Cited

U.S. PATENT DOCUMENTS 6,474,292 B1* 11/2002 Frenz ..................... F02D 41/22
123/198 D
7,010,415 B2* 3/2006 Dolker .................. F02D 41/222
123/456
(Continued)

FOREIGN PATENT DOCUMENTS

DE 19547647 A1 6/1997
DE 19834660 A1 2/2000
(Continued)

*Primary Examiner* — Sizo Vilakazi
(74) *Attorney, Agent, or Firm* — Maier & Maier, PLLC

(57) ABSTRACT

The invention relates to a method for operating a drive unit, wherein the drive unit has an internal combustion engine, which is provided with at least one fuel pump, which is controlled and/or regulated by a pump control unit and which is intended for introducing fuel into a pressure accumulator; a metering system for introducing fuel, which has been metered by means of a lambda function unit, from the pressure accumulator into the internal combustion engine; and a pressure sensor for determining the pressure in the pressure accumulator; and wherein the output variables of the pump control unit and the lambda function unit are evaluated in order to determine a malfunction of the internal combustion engine. In this case, it is provided that additionally the pressure sensor is subjected to at least a defined test pressure for at least a short period of time and that the pressure that is measured with the pressure sensor is compared with the defined test pressure, in order to determine or rule out a malfunction of the pressure sensor. Furthermore, the invention relates to a drive unit.

2 Claims, 1 Drawing Sheet

(51) Int. Cl.
*F02D 41/18* (2006.01)
*F02D 41/38* (2006.01)

(52) U.S. Cl.
CPC ..... *F02D 41/3863* (2013.01); *F02D 2041/223* (2013.01); *F02D 2041/224* (2013.01); *F02D 2041/228* (2013.01); *F02D 2200/0602* (2013.01); *Y02T 10/40* (2013.01)

(58) Field of Classification Search
CPC .......................... 41/3836;F02D 2250/31; F02D 2041/223; F02D 41/222; F02D 41/22; F02D 41/1454; F02D 41/187; F02D 41/3863; F02D 2041/228; F02M 63/0225; Y02T 10/40
USPC ....... 123/446, 447, 456, 457, 458, 495–505, 123/510, 511, 494; 73/114.43
See application file for complete search history.

(56) References Cited

U.S. PATENT DOCUMENTS

| | | | | |
|---|---|---|---|---|
| 7,991,538 B2* | 8/2011 | Olbrich | ................ | F02D 41/222 123/458 |
| 2005/0005912 A1* | 1/2005 | Joos | ...................... | F02D 41/222 123/458 |
| 2006/0144130 A1* | 7/2006 | Eser | ...................... | F02D 41/221 73/114.43 |
| 2009/0013966 A1* | 1/2009 | Serra | ...................... | F04B 51/00 123/458 |
| 2010/0294030 A1* | 11/2010 | Lucido | ................. | F02D 41/221 73/114.43 |

FOREIGN PATENT DOCUMENTS

| | | |
|---|---|---|
| DE | 10003906 A1 | 8/2001 |
| DE | 10145194 C1 | 5/2003 |
| DE | 10205377 A1 | 8/2003 |
| WO | 0102720 A1 | 1/2001 |

* cited by examiner

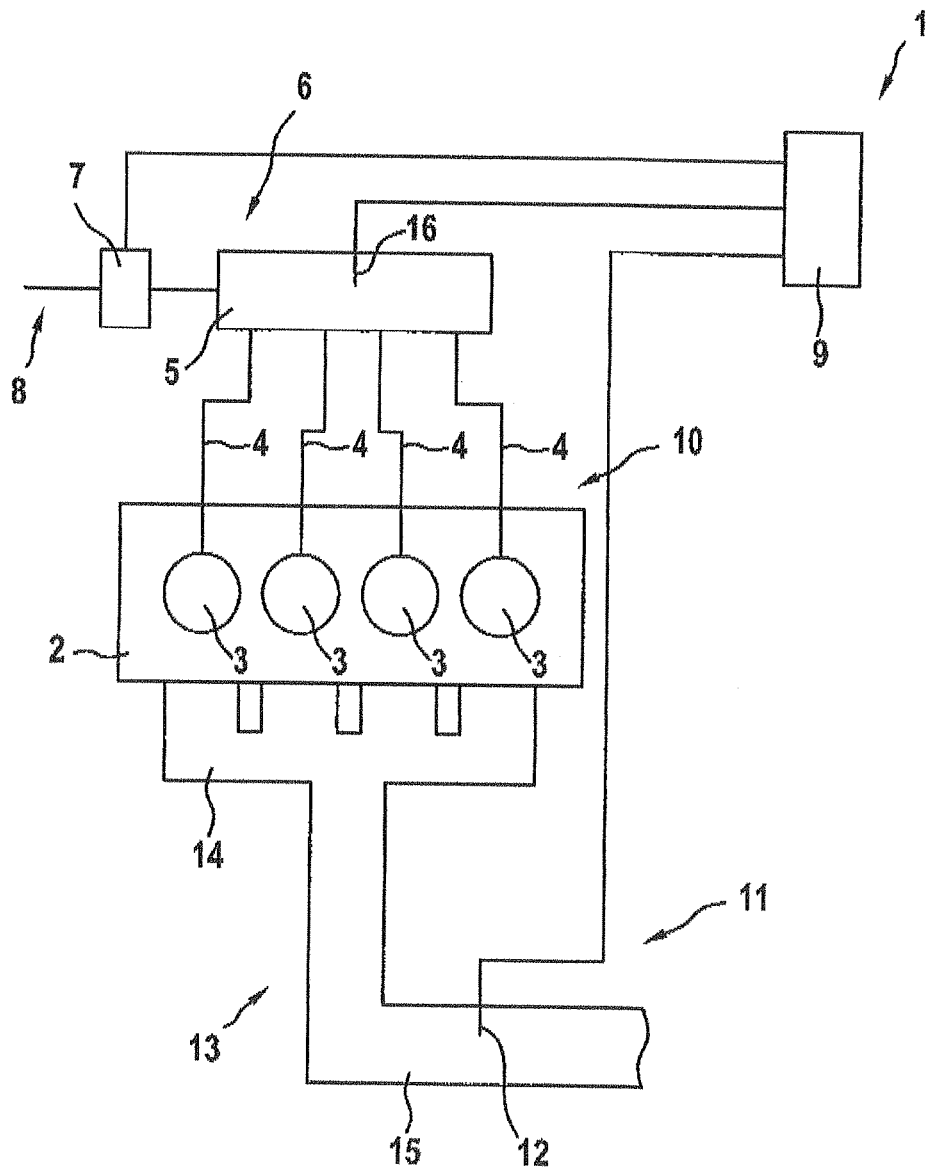

METHOD FOR OPERATING A DRIVE UNIT AND DRIVE UNIT

The invention relates to a method for operating a drive unit, wherein the drive unit has an internal combustion engine, which is provided with at least one fuel pump, which is controlled and/or regulated by a pump control unit and which is intended for introducing fuel into a pressure accumulator; a metering system for introducing fuel, which has been metered by means of a lambda function unit, from the pressure accumulator into the internal combustion engine; and a pressure sensor for determining the pressure in the pressure accumulator; and wherein the output variables of the pump control unit and the lambda function unit are evaluated in order to determine a malfunction of the internal combustion engine. Furthermore, the invention relates to a drive unit.

BACKGROUND OF THE INVENTION

Methods that exhibit the features of the present invention are known from the prior art. In this case, the fuel pump is a high pressure pump, which is located downstream of an electrically regulated low pressure pump. Thus, the fuel is conveyed first from the low pressure pump to an inlet of the fuel pump. At the same time, the pressure of the fuel is adjusted in a controlling and/or regulating manner to a predetermined desired value (typically, in a magnitude of 5 to 6 bar). For this purpose there is, for example, a low pressure sensor, which is arranged on the inlet side of the fuel pump. Then the fuel is conveyed from the fuel pump into the pressure accumulator, the so-called fuel high pressure rail. This pressure accumulator is connected to injection valves by means of which the fuel can be introduced into the internal combustion engine. In more precise terms, the fuel can be introduced into a combustion chamber of at least one cylinder. Thus, the injection valve controls or rather regulates the amount of fuel that is introduced into the combustion chamber. At the same time, this amount of fuel is adjusted to the amount of air that is in the cylinder. In order to adjust the amount of fuel, the invention provides that the opening duration of the injection valves is adjusted to a defined injection time.

The pressure in the pressure accumulator is the decisive factor that influences the combustion in the internal combustion engine or rather in the cylinder. As a function of the operating mode of the internal combustion engine, the pressure in the pressure accumulator can be suitably adjusted with respect to the consumption, emission, power output, and smooth running of the internal combustion engine. For this purpose, the pressure is adjusted in a controlling and/or regulating manner to different desired values as a function of a number of parameters, such as the load and rotational speed. In this case, the resulting lowest pressure is, for example, in a magnitude ranging from approximately 25 to 35 bar. The resulting maximum pressure depends on the type of injection valves or rather the drive unit that is used. In order to measure the pressure prevailing momentarily in the pressure accumulator, there is a pressure sensor. The sensor signals of the pressure sensor or rather the pressure measured with the pressure sensor is also used to calculate the injection time that is required to introduce the desired amount of fuel into the internal combustion engine, because the injection time depends predominantly on the pressure in the pressure accumulator. For this purpose, the pump control unit of the fuel pump is suitably adjusted. To this end, there is a pilot control unit that in the case of a drive unit leads to the adjustment of the desired pressure in the pressure accumulator without any disturbances. In order to compensate for the influence of disturbances (in particular, caused by defects and/or malfunctions of the drive unit), the pump control unit is provided with a regulator. Potential defects of the drive unit include, for example, a malfunction of the fuel pump (in which case, either a too high or a too low amount of fuel is introduced into the pressure accumulator), a pressure loss, or a malfunction of the pressure sensor, which on the basis thereof delivers an incorrect sensor signal. Such defects and/or malfunctions have an extremely adverse effect on the dynamic behavior of the internal combustion engine and additionally on the emissions, both of which can be discerned by the person using the drive unit.

Therefore, monitoring the internal combustion engine with respect to such malfunctions is logical and to some extent even prescribed by law. In the case of the aforementioned malfunctions, a disturbance acts on the whole system of the internal combustion engine and the drive unit, a circumstance that results in the pump control unit or rather the regulator of the pump control unit having to make readjustments, because the pilot control, which is matched to a system without any disturbances, no longer results in an adjustment of the desired pressure in the pressure accumulator. In the case of a fuel pump which pumps too little fuel and/or in the case of a pressure loss, the pump control unit adjusts the fuel pump in such a way that the amount of fuel delivered by this pump increases. In the case of a fuel pump which delivers an amount of fuel that is too much, the pump control unit adjusts the fuel pump in such a way that the amount of fuel that is delivered is decreased.

Furthermore, the internal combustion engine is provided with a lambda function unit, which monitors the composition of the fuel-air mixture that is introduced into the internal combustion engine. Thus, this lambda function unit can check whether the composition that is actually on hand corresponds to a desired and/or adjusted composition. Thus, both the pump control unit and the lambda function unit have output variables that can be used to determine the malfunction of the internal combustion engine. In this respect, the output variable of the pump control unit can establish whether an adjustment of the delivery capacity of the fuel pump is necessary, based on the value set by the pilot control unit, in order to obtain the desired pressure in the pressure accumulator. At the same time, the lambda function unit can determine whether the current composition deviates from the adjusted composition of the fuel-air mixture. In this case, the lambda function unit establishes primarily whether the amount of fuel that has been introduced into the internal combustion engine has to be increased or decreased.

As soon as the output variables of the pump control unit and/or the lambda function unit exhibit a deviation from a desired behavior of the drive unit, there is the possibility of a malfunction of the internal combustion engine. However, there may be cases in which it may not be possible to establish which component of the internal combustion engine is exhibiting a malfunction, that is, for example, whether the fuel pump or the pressure sensor is defective or whether there is a pressure loss. This is especially the case when several structural parts or rather components of the drive unit are defective and/or exhibit a malfunction at the same time.

Therefore, the object of the invention is to provide a method that does not exhibit this drawback, but rather makes it possible to determine with a higher degree of accuracy the component that exhibits a malfunction.

SUMMARY OF THE INVENTION

This method provides that additionally the pressure sensor is subjected to at least a defined test pressure for at least a short period of time and that the pressure that is measured with the pressure sensor is compared with the defined test pressure, in order to determine or rule out a malfunction of the pressure sensor. If the pressure sensor is functioning properly, then, in the case of a defective fuel pump or a pressure loss, it is possible to continue to calculate correctly the injection time, because the pressure in the pressure accumulator can be determined with the pressure sensor. This means that the amount of fuel that corresponds to the amount of air on hand is introduced into the internal combustion engine. Thus, the result is the desired composition of the fuel-air mixture, and the lambda function unit that ensures that the desired composition of the fuel-air mixture is maintained does not have to readjust the amount of fuel that is introduced into the internal combustion engine beyond the usual limits. If, in contrast, there is a malfunction of the pressure sensor, and if this pressure sensor delivers, for example, a sensor signal that corresponds to a pressure in the pressure accumulator that is higher than the pressure that is actually present in the pressure accumulator, then a too short injection time is calculated on the basis of the difference between the actually prevailing pressure and the pressure measured with the pressure sensor. Consequently, the injected amount of fuel is too low. The result is that the lambda function unit increases the amount to be injected. If, in contrast, the pressure sensor determines a pressure that is below the actual value, then the amount to be injected is decreased by the lambda function unit. If the pressure sensor delivers too high a pressure, then the result is that too short an injection time is calculated. Consequently the amount of fuel drawn from the pressure accumulator is less than the predetermined amount of fuel. As a result, the pressure in the pressure accumulator continues to rise, whereupon the pump control unit drives the fuel pump in such a way that less fuel is delivered into the pressure accumulator. The reverse applies correspondingly to a pressure sensor that indicates too low a pressure.

In some cases it is possible to determine the malfunction of the internal combustion engine, just on the basis of the output variables of the pump control unit and the lambda function unit, and also to establish which component of the internal combustion engine or rather the drive unit exhibits a malfunction. However, even in the event that the internal combustion engine is running faultlessly, the output variables can indicate a malfunction even though there really is no malfunction. On the other hand, it may happen that other reasons are the cause for a deviation of the composition of the fuel-air mixture and, thus, for the intervention of the lambda function unit. In this case, it may happen that a malfunction of the internal combustion engine is determined, but the component which exhibits the malfunction cannot be determined and/or is incorrectly determined. The said reasons can be, for example, the introduction of fuel vapors into an intake pipe of the internal combustion engine in the course of a tank ventilation or a crankcase ventilation operation. For this reason, the pressure sensor should be checked in order to determine or rule out a malfunction of the pressure sensor. To this end, the pressure sensor is subjected to a defined test pressure for at least a short period of time; and the sensor signal, fed back by the pressure sensor, and/or the pressure, measured with the pressure sensor, should be compared with the test pressure. If the measured pressure deviates from the defined test pressure, then a malfunction of the pressure sensor can be inferred. In this way, the accuracy of localizing the malfunction inside the internal combustion engine or rather the drive unit is significantly improved.

A change in a sensor characteristic curve of the pressure sensor can be recognized by comparing the measured pressure with the defined test pressure. In this case, the defined test pressure is preferably a pressure that cannot be influenced by the components that are to be diagnosed. Preferably, several defined test pressures are used that exhibit the maximum distance from each other. For example, a low test pressure is at a lower end, and a high test pressure is at an upper end of the sensor characteristic curve. In this way, the whole range of values of the pressure sensor can be covered.

A further development of the invention provides that the test pressure is a low test pressure prevailing in a low pressure system of the internal combustion engine and/or a high test pressure that is defined by an opening pressure of a pressure limiting device. The low pressure system of the internal combustion engine is typically connected to the pressure accumulator by way of a valve, in particular a check valve. When the internal combustion engine is running, this valve is closed. Especially in a state of the drive unit in which the internal combustion engine is not driven, it is provided that the valve is open so as to adapt the pressure in the pressure accumulator to the pressure of the low pressure system. The low pressure system is usually provided with a low pressure sensor, with which the pressure in the low pressure system can be determined. In this way, the pressure, measured by the pressure sensor, that is, its sensor signal, can be compared with the pressure determined by means of the low pressure sensor. If this comparison yields a difference that is greater than a maximum difference, then there exists a malfunction of the pressure sensor. Similarly, the pressure accumulator has the pressure limiting device, which prevents the pressure accumulator from having too high a pressure. The pressure limiting device can be implemented, for example, by means of a pressure limiting valve or a pressure relief valve respectively. In order to obtain the high test pressure, the fuel pump is operated in such a way that the pressure accumulator has a pressure that overcomes the opening pressure of the pressure limiting device, which in turn limits the pressure in the pressure accumulator to the opening pressure, that is, the high test pressure.

A further development of the invention provides that the low test pressure is adjusted by producing a connection between the pressure accumulator and the low pressure system. This connection is provided especially if the fuel pump is not operated and/or the internal combustion engine is shut off. As already addressed above, the connection can be provided by opening the valve.

A further development of the invention provides that the low test pressure is adjusted after a defined immobilization time and/or at a defined temperature of the internal combustion engine and/or at a defined pressure in the pressure accumulator. If the internal combustion engine is shut off while it is at a high temperature level, then the temperature of the fuel in the pressure accumulator rises, because, on the one hand, the pressure accumulator is no longer cooled by the fuel flowing through; and, on the other hand, if a drive unit is used in a motor vehicle, there is no need for cool air, caused by the wind generated by the moving vehicle, to flow through the engine compartment. However, usually the fuel cannot escape from the pressure accumulator, because there is no connection between the pressure accumulator and the low pressure system. Thus, the pressure of the fuel in the pressure accumulator increases owing to the increase in volume of the fuel due to the temperature increase of the fuel. Thus, it is possible to achieve the pressure at which the pressure limiting device limits the pressure, thus decreasing the amount of fuel that is in the pressure accumulator until the pressure in the pressure accumulator has fallen below the opening pressure. If the internal combustion engine stays off, then its temperature is equal to the ambient temperature. This also applies to the fuel in the pressure accumulator. Consequently, the volume and the pressure of the fuel decrease again. As soon as the pressure in the pressure accumulator matches in essence a pressure in the low pressure system, the connection between the pressure accumulator and the low pressure system is produced, for example, by opening the valve. In this way, the pressure of the low pressure system is set in the pressure accumulator. However, this pressure is known by the low pressure sensor, which can carry out, as described above, the equalization between the pressure sensor and the low pressure sensor. The adjustment of the low test pressure, in particular by producing a connection between the pressure accumulator and the low pressure system, can be provided following the defined immobilization time of the internal combustion engine, at a defined existing temperature and/or in the presence of the defined pressure in the pressure accumulator.

A further development of the invention provides that the high test pressure is adjusted by adjusting the fuel pump to a delivery capacity at which the opening pressure of the pressure limiting device is obtained. When the internal combustion engine is running under normal operating conditions, the opening pressure is not usually reached. For this reason the high test pressure has to be actively adjusted by means of the pump control unit. This adjustment is done in such a way that the fuel pump is adjusted to a maximum delivery capacity for at least a short period of time.

A further development of the invention provides that the pressure sensor is subjected to the low test pressure in a defined interval. This feature can be provided, for example, whenever the internal combustion engine is shut off.

A further development of the invention provides that when the measured pressure deviates from the test pressure, especially the low test pressure, an error memory is set. Thus, the malfunction is not immediately indicated when the measured pressure deviates from the test pressure. Rather, the error memory is set first. Such a procedure is provided especially for the low test pressure, because it can happen that after shutting off the internal combustion engine the pressure between the pressure accumulator and the low pressure system is not equalized. Thus, when the pressure sensor is compared with the low pressure sensor, a deviation would be found, and a malfunction would be indicated by mistake.

A further development of the invention provides that the malfunction of the internal combustion engine is indicated when the error memory is set, and the malfunction of the internal combustion engine is recognized by means of the output variables of the pump control unit and the lambda function unit. Thus, the malfunction is not indicated until both the error memory is set on the basis of the measured pressure deviating from the test pressure and also, on the basis of the output variables, the malfunction is determined. As described above, a malfunction may not necessarily really exist when the measured pressure deviates from the low test pressure. For this reason several criteria are evaluated before the malfunction of the internal combustion engine is actually indicated.

A further development of the invention provides that the malfunction of the internal combustion engine is indicated when the pressure sensor is subjected to the high test pressure and the measured pressure deviates from this pressure. In contrast to the low test pressure, the high test pressure can be reached comparatively reliably by adjusting the fuel pump to its maximum delivery capacity. Then the pressure that is measured by means of the pressure sensor can be compared with the opening pressure of the pressure limiting device. In the event that there is a deviation, then it is most likely that there is also a malfunction of the internal combustion engine. Since, additionally, the output variables of the pump control unit and the lambda function unit are evaluated, the malfunction or rather the component in which the malfunction occurs can be localized.

A further development of the invention provides that the pressure sensor is subjected to the high test pressure only if the error memory is set and/or the malfunction is recognized by means of the output variables of the pump control unit and the lambda function unit. It is practical to adjust the high test pressure as infrequently as possible, because, in this case, the wear of the injection valves of the internal combustion engine is significantly increased. In this case, the pressure limiting device is also subjected to significant wear, because the pressure prevailing in the pressure accumulator is adjusted by constantly opening and closing the pressure limiting device. Thus, the high test pressure is adjusted only if the malfunction has already been determined and/or it is most likely that a malfunction exists. The latter is the case if the error memory is set; the former, if the malfunction has already been recognized by means of the output variables of the pump control unit and the lambda function unit. In this way, the frequency with which the pressure sensor is subjected to the high test pressure can be significantly reduced.

Furthermore, the invention relates to a drive unit, in particular for implementing the above-described method, with an internal combustion engine, which is provided with at least one fuel pump, which is controlled and/or regulated by a pump control unit and which is intended for introducing fuel into a pressure accumulator; a metering system for introducing fuel, which has been metered by means of a lambda function unit from the pressure accumulator into the internal combustion engine; and a pressure sensor for determining the pressure in the pressure accumulator; and wherein the drive unit is configured for this purpose. The output variables of the pump control unit and the lambda function unit are evaluated in order to determine a malfunction of the internal combustion engine. At the same time, it is provided that the drive unit is additionally configured so as to subject the pressure sensor to at least a defined test pressure for at least a short period of time and to compare the measured pressure with the defined test pressure in order to determine or rule out a malfunction of the pressure sensor.

BRIEF DESCRIPTION OF THE DRAWING

The single FIGURE is a schematic drawing of a drive unit for implementing the above-described method.

DETAILED DESCRIPTION OF THE PREFERRED EMBODIMENTS OF THE INVENTION

The FIGURE shows a drive unit 1 with an internal combustion engine 2, which has four cylinders 3 in the present embodiment. The cylinders 3 can be supplied with fuel by way of fuel high pressure lines 4. Each of the fuel high pressure lines 4 is connected to at least one injection valve on the side of the cylinders 3. On the side facing away from the injection valves, the fuel high pressure lines 4 are connected to a pressure accumulator 5, also referred to as the fuel high pressure rail. The pressure accumulator 5 is part of a high pressure system 6, which also has a fuel pump 7. The fuel pump 7 pumps fuel from a low pressure system 8 (not shown in detail) and is connected to a pump control unit, which is a component of a control and/or regulating device 9. The injection valves (not shown in detail here) of the internal combustion engine 2 are a part of a metering system 10 which introduces the fuel, metered from the pressure accumulator 5, into the internal combustion engine 2 or rather the cylinders 3 (by way of the injection valves). The introduction of the fuel here is metered by means of a lambda function unit 11, which consists, for example, of a lambda probe 12, which is disposed in an exhaust gas system 13 of the internal combustion engine. The exhaust gas system 13 comprises an exhaust gas manifold 14, with which the exhaust gas of the cylinders 3 is combined and conveyed to an exhaust gas line 15. The exhaust gas line 15 can release the exhaust gas of the internal combustion engine 2 into the vicinity of the drive unit 1. The lambda function unit 11 is connected to the control and/or regulating device 9. The pressure accumulator 5 is provided with a pressure sensor 16, which is also connected to the control and/or regulating device 9.

Thus, the control and/or regulating device 9 exhibits the pump control unit and, in certain sections, the lambda function unit 11. When the drive unit 1 and/or the internal combustion engine 2 is (are) operating under normal conditions, a pilot control unit of the pump control unit serves to set a defined pressure in the pressure accumulator 5. In addition, the pump control unit has a regulator, which, in the event that the pressure in the pressure accumulator deviates from the set pressure, increases or decreases the delivery capacity of the fuel pump 7 so that the pressure actually prevailing in the pressure accumulator 5 is adjusted to the desired pressure. The pressure accumulator 5 has a pressure limiting device (not shown in detail) which comprises, for example, a pressure limiting valve. This pressure limiting valve has the task of avoiding a pressure in the internal combustion engine 2 and the pressure accumulator 5 which could result in damage. To this end, the pressure limiting device has an opening pressure exceeding the usual pressure when the internal combustion engine is operating under normal conditions. For example, the pressure limiting device has a spring-loaded disk valve, which opens against the spring pressure owing to the pressure in the pressure accumulator 5.

In the meantime, it is prescribed by law, especially in the USA and Europe, that a defect of a component of the drive unit 1, which can result in adverse effects on the emission behavior, must be indicated to the driver of a motor vehicle, in which the drive unit 1 is installed, by means of a so-called MIL (malfunction indicator lamp). In addition, an error code, specific to the respective defect, must be outputted into a malfunction memory. Then this error code can be read out by a manufacturer-independent or manufacturer-dependent device and serves as a means for a targeted correction of the malfunction. This procedure is summed up under the term on-board diagnosis (OBD).

Working on this basis, the objective in general terms is to identify the defective component of the drive unit as accurately as possible by the entry in the malfunction memory. For example, a defective load sensor which incorrectly determines the amount of air that is fed to the internal combustion engine 2 can lead to an incorrect determination of the amount of fuel to be injected. In the event of such an error symptom, the law prescribes the input of an entry into the malfunction memory "mixture too lean/rich." However, this entry describes only the problem and not the cause. Therefore, the general trend is to identify in parallel or as an alternative the component that is responsible for causing the problem, in this case, the load sensor, using a suitable diagnostic strategy. At this point it is customary to evaluate the output variables of the pump control unit and the lambda function unit 11 in order to determine a malfunction of the internal combustion engine 2. If, however, a number of components (which include, for example, the pressure accumulator 5, the fuel pump 7, the pressure sensor 16, and the lambda function unit 11) are defective, then it may be possible to determine the malfunction of the internal combustion engine 2, but not the component that exhibits the malfunction.

Therefore, the drive unit 1 should also subject the pressure sensor 16 to at least a defined test pressure for at least a short period of time and compare the pressure, measured by means of the pressure sensor 16, with the defined test pressure. Then, it is possible to use this comparison to derive or rule out a malfunction of the pressure sensor 16. Preferably, a low and a high test pressure are used. In this way, all conceivable error symptoms that can occur in the region of the internal combustion engine 2 can be determined. These error symptoms may include, for example, an offset error, a change in the rise of the sensor characteristic curve, or a pressure sensor 16 which indicates a constant value. In order to set the low test pressure, the procedure is as follows. When the internal combustion engine 2 is turned off and the coolant temperature and the intake air temperature exceed defined values, a marker will be set as information for a hot shutdown. If, in the event of a subsequent restart of the internal combustion engine 2, a defined shutdown time duration is exceeded, a certain coolant temperature and/or intake air temperature being undershot, then it is checked whether the value of the pressure sensor 16 is in a certain range around the pressure determined by means of a pressure sensor 16 of the low pressure system 8. If this is not the case, then an error memory is set, but the possible malfunction is not yet indicated or entered into the malfunction memory. This error memory is supposed to be maintained (even over several operating cycles) until the testing of the pressure sensor 16 at the low test pressure can take place again. This is mandatory because the information about whether there exists a malfunction of the pressure sensor 16 is necessary in order to be able to localize the component that exhibits the malfunction. Otherwise, the malfunction and/or the localization of the component that exhibits the malfunction would be detectable only after a detected hot shutdown with a subsequent long immobilization time duration. The error memory should not be deleted even if the malfunction memory is reset.

In contrast, the pressure sensor 16 is not subjected to the high test pressure until the malfunction of the internal combustion engine 2 has already been recognized in a different way. In addition, the internal combustion engine 2 should be in an operating range in which it is under a high load, because in this case, the pressure in the pressure accumulator 5 does not deviate that much from the pressure that prevails under normal operating conditions. This means that the pressure prevailing under normal operating conditions in the pressure accumulator 5 should be as close as possible to the opening pressure of the pressure limiting device. During the testing of the pressure sensor 16 at the high test pressure it is checked whether the measured pressure matches in essence the opening pressure of the pressure limiting device and/or deviates just a little therefrom. In this case, it must be taken into account that since static pressure develops on opening the pressure limiting device, the result will be a deviation of the pressure in the pressure accumulator 5, said pressure being a function of the rotational speed of the internal combustion engine 2. The pressure sensor 16 is subjected to the high test pressure only until it is determined that the measured pressure corresponds to the opening pressure or if a maximum test time duration has expired. If the opening pressure is not indicated by the pressure sensor up to the passage of the maximum test time duration, then the error memory is set and/or the malfunction of the internal combustion engine 2 is indicated or entered into the malfunction memory.

In this case, the correlations, shown in the following table, apply.

| Pump Control Unit | Lambda Function Unit 11 | Pressure Sensor 16 | Malfunction |
| --- | --- | --- | --- |
| decreases the amount of fuel that is delivered | increases the injection amount | at the upper or lower test pressure, outside range of expectation | pressure sensor 16 shows too high |
| increases the amount of fuel that is delivered | decreases the injection amount | | pressure sensor 16 shows too low |
| decreases the amount of fuel that is delivered | about zero position | at the upper and lower test pressure, within range of expectation | fuel pump 7 delivers too much |
| increases the amount of fuel that is delivered | about zero position | at the upper and lower test pressure, within range of expectation | fuel pump 7 delivers too little; pressure loss |
| Alternative Diagnostic Paths (without evaluation of the pump regulator) | | | |
| actual pressure below desired pressure | about zero position | at the upper and lower test pressure, within range of expectation | fuel pump 7 delivers too little; pressure loss |
| fuel pump 7 at maximum delivery capacity, pressure after a certain time despite small withdrawal amount still below desired | no consideration | no consideration necessary, since in any case already direct active diagnosis without regulator consideration | fuel pump 7 delivers too little; pressure loss |
| fuel pump 7 at zero delivery, pressure still above desired | no consideration | | fuel pump 7 delivers too much |

The invention claimed is:

1. A method of determining a malfunction of the drive unit of a motor vehicle including an internal combustion engine, a pressure accumulator provided with a pressure sensor, operatively connected to said engine, a fuel pump operatively connected to said accumulator and control means operable to control said fuel pump and read said sensor, comprising:

operating said fuel pump under selected high and low operating conditions;

sensing a plurality of pressure values of said accumulator while operating said fuel pump under said selected high and low operating conditions including at least one high pressure value and at least one low pressure value;

storing said sensed plurality of pressure values;

sensing a pressure value of said accumulator at a subsequent time;

comparing said subsequent pressure value with said stored plurality of pressure values;

storing an error memory if said subsequent pressure value is greater than said high pressure value or lower than said low pressure value; and determining a malfunction of a component of the drive unit on the basis of the stored error memory and at least one output variable of the control means.

2. A control system for an internal combustion chamber of a motor vehicle provided with a fuel pressure accumulator and a fuel pump, comprising:

means for operating said fuel pump under high and low operating conditions;

means for sensing a plurality of pressure value of said accumulator while operating said fuel pump under said selected high and low operating conditions including at least one high pressure value and at least one low pressure value;

means for storing said plurality of sensed pressure values;

means for sensing a pressure value of said accumulator at a subsequent time;

means for comparing said subsequent pressure value with said stored plurality of pressure values;

means for storing an error memory if said subsequent pressure value is greater than said high pressure value or lower than said low pressure value; and means for determining a malfunction of a component of the drive unit on the basis of the stored error memory and at least one output variable of the control system.

* * * * *